United States Patent [19]

Shimomura et al.

[11] Patent Number: 4,777,189

[45] Date of Patent: Oct. 11, 1988

[54] PRODUCTION OF POLYURETHANE FOAM

[75] Inventors: Kenji Shimomura; Shigeaki Kouketsu, both of Yokohama; Toru Okuyama, Sagamihara; Take Sato, Yokohama, all of Japan

[73] Assignees: Ikeda Bussan Co., Ltd., Kanagawa; Bridgestone Corporation, Tokyo, both of Japan

[21] Appl. No.: 67,970

[22] Filed: Jun. 30, 1987

Related U.S. Application Data

[62] Division of Ser. No. 756,800, Jul. 19, 1985, Pat. No. 4,696,952.

[30] Foreign Application Priority Data

Jul. 26, 1984 [JP] Japan .................................. 59-156176

[51] Int. Cl.$^4$ ............................ C08K 5/52; C08K 5/53; C08K 18/08
[52] U.S. Cl. ..................................... 521/107; 524/130; 524/141; 524/143; 528/65; 528/72; 252/609
[58] Field of Search ................. 521/107; 524/130, 141, 524/143; 528/65, 72; 252/609

[56] References Cited

U.S. PATENT DOCUMENTS 4,565,833   1/1986   Buszard et al. ..................... 521/107

Primary Examiner—John Kight
Assistant Examiner—M. L. Moore
Attorney, Agent, or Firm—Birch, Stewart, Kolasch & Birch

[57] ABSTRACT

Flame-retardant polyurethane foam having a very good skin weldability and a very low level of skin staining is produced from a polyhydroxy compound, organic polyisocyanate, blowing agent, catalyst, foam stabilizer, and flame retardant, and other additives, wherein the flame retardant contains a triaryl phosphate ester and the polyhydroxy compound is a mixture composed of 100 parts by weight of high-molecular-weight polyhydroxy compound having a hydroxyl number lower than 100 and 0.5 to 10 parts by weight of low-molecular-weight polyhydroxy compound having a hydroxyl number higher than 560 and having 2 to 4 hydroxyl groups in one molecule.

15 Claims, No Drawings

PRODUCTION OF POLYURETHANE FOAM

This application is a divisional of copending application Ser. No. 756,800, filed on July 19, 1985, now U.S. Pat. No. 4,696,952.

BACKGROUND OF THE INVENTION

1. Filed of the Invention

The present invention relates to a process for producing a flexible polyurethane foam. More particularly, it relates to a flame-retardant weldable polyurethane foam having a skin improved in stain resistance.

2. Description of the Prior Art

Polyurethane foam is in general use as cushioning materials for vehicles, furniture, bedding and the like because of its superior elastic properties. It also finds use as building materials and heat insulation materials. Polyurethane foam used as cushioning materials is usually covered with a skin material such as cloth or leather which is welded to the surface thereof.

Since polyurethane foam is rather combustible, studies have long been made to render it flame retardant. One way of achieving this object is to incorporate a proper flame retardant into the raw materials of polyurethane foam. Flame retardants in common use are as follows:

(a) Liquid flame retardants based on halogen-containing phosphate ester or phosphite ester; e.g., tris-2,3-dichloropropyl phosphate.

(b) Powder flame retardants composed of antimony trioxide and halogen-containing compound; e.g., a composition of antimony trioxide and vinyl chloride.

(c) Phosphorus-containing compounds or halogen-containing compounds used alone; e.g., chlorinated paraffin.

The flame retardant belonging to the above category (a) is good in flame retardance and has only a small effect on the welding of skin materials; however, it has a disadvantage of staining the skin material. In other words, it migrates to the skin material at the time of welding and stains it gradually with time. The flame retardant belonging to the above category (b) is good in flame retardance and has only a slight tendency toward skin staining; however, it impairs the weldability completely. The flame retardant belonging to the above category (c) is less effective than others in flame retardance and is required to be added in large amounts to polyurethane foam. Moreover, it has a disadvantage of markedly impairing the weldability.

With the conventional flame retardants, it was difficult to improve the flame retardance of polyurethane foam while keeping the weldability and avoiding the skin staining.

SUMMARY OF THE INVENTION

Accordingly, it is an object of this invention to provide a process for producing a flexible polyurethane foam having an excellent flame resistance as well as very good skin weldability and very low level of skin staining.

In order to attain the above object, the present inventors carried out a series of studies, which led to the discovery that a specific triaryl phosphate ester is effective as a flame retardant for polyurethane foam.

More specifically, the present inventors investigated the skin staining caused by a flame retardant and found the following.

(i) Skin staining is less likely to occur where the flame retardant is a hydrocarbon compound containing phosphorus alone in addition to C, H, and O.

(ii) Skin staining occurs where the flame retardant is a hydrocarbon compound containing both phosphorus and halogen in addition to C, H, and O.

(iii) Skin staining is liable to occur where the flame retardant is a liquid halogen-containing phosphate ester. This compound is easy to hydrolyze on heating or after use for a long time to give hydrogen chloride which in turn decomposes the phosphate ester and forms phosphorus chlorides which causes skin staining. Powder flame retardants are less liable to cause skin staining than liquid flame retardants.

The present inventors continued their studies and found that the triaryl phosphate ester represented by the formula:

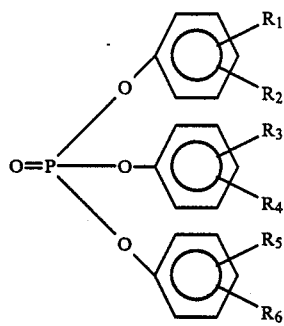

[where $R_1$ to $R_6$ are a substituent group selected from H and $C_nH_{2n+1}$ (where n is an integer of 1 to 9), with the exception of an instance where $R_1=R_3=R_5=H$ and $R_2=R_4=R_6=CH_3$] is a good flame retardant with no tendency toward skin staining. The triaryl phosphate ester excludes the tricresyl phosphate represented by the following formula:

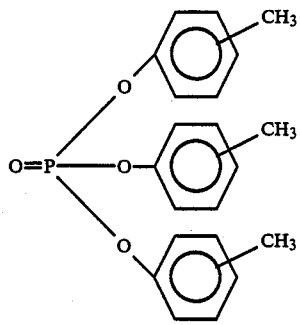

because its flame-resistant effect is little.

Therefore, according to the present invention, there is provided a process for producing a flexible polyurethane foam from a polyhydroxy compound, organic polyisocyanate, blowing agent, catalyst, foam stabilizer, and flame retardant, and other additives, wherein the flame retardant contains a triaryl phosphate ester represented by the following formula;

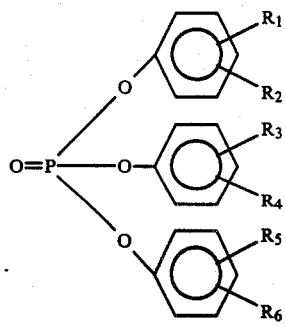

[where $R_1$ to $R_6$ are a substituent group selected from H and $C_nH_{2n+1}$ (where n is an integer of 1 to 9), with the exception of an instance where $R_1=R_3=R_5=H$ and $R_2=R_4=R_6=CH_3$], and the polyhydroxy compound is a mixture composed of 100 parts by weight of high-molecular-weight polyhydroxy compound having a hydroxyl number of lower than 100 and 0.5 to 10 parts by weight of low-molecular-weight polyhydroxy compound having a hydroxyl number of higher than 560 and having 2 to 4 hydroxyl groups in one molecule.

The process of this invention has the effect of producing the flame-retardant flexible polyurethane foam having very good skin weldability and very low level of skin staining in an industrially advantageous way.

The above and other objects, features and advantages of the present invention will be more apparent from the following description.

DETAILED DESCRIPTION OF THE INVENTION

The polyhydroxy compound used in this invention is a mixture of a high-molecular-weight polyhydroxy compound having terminal hydroxyl group (which is commonly called polyether polyol) and a low-molecular-weight polyhydroxy compound having terminal hydroxyl groups.

The polyether polyol includes, for example, high-molecular-weight polyhydroxy compounds having a hydroxyl number of lower than 100, which are produced by ring-opening addition polymerization of a polyhydroxy compound (such as glycerol, trimethylolpropane, or pentaerythritol) and an alkylene oxide such as propylene oxide or ethylene oxide by using an alkali catalyst. Those commonly used for the production of flexible polyurethane foam are suitable. A preferred example is poly(oxypropylene) triol which is produced by reacting glycerol with propylene oxide.

The low-molecular-weight polyhydroxy compound may be an aliphatic alcohol which has a hydroxyl number of greater than 560 and has 2 to 4 hydroxy groups in one molecule. Examples of such a compound include diols such as ethylene glycol, propylene glycol, diethylene glycol, dipropylene glycol, 1,4-butanediol, 1,3-propanediol, and triethylene glycol; and triols such as glycerol, trimethylolpropane, triethylolpropane, trimethylolethane, triethylolethane, pentaerythritol, and 1,2,6-hexanetriol.

In the case where a high-molecular-weight polyhydroxy compound and a low-molecular-weight polyhydroxy compound are used in combination as the polyhydroxy compound, the resulting flexible polyurethane foam has improved flame-retardance and weldability. One hundred parts by weight of high-molecular-weight polyhydroxy compound is mixed with 0.5 to 10 parts by weight, preferably 0.5 to 5 parts by weight, of low-molecular-weight polyhydroxy compound. If the amount of the latter compound is less than the lower limit specific above, the resulting polyurethane foam is not sufficiently improved in flame retardance and weldability. Conversely, if it is in excess of the upper limit, the resulting polyurethane foam is of closed cell type which shrinks during the cooling process in production.

The organic polyisocyanate used in this invention is one which is commonly used for the production of polyurethane foam. It is an aliphatic polyisocyanate or aromatic polyisocyanate or a modified product thereof containing two or more isocyanate groups in one molecule. Examples of aliphatic polyisocyanate include hexamethylene diisocyanate, isophorone diisocyanate, and methylcyclohexane diisocyanate; and examples of aromatic polyisocyanate include tolylene diisocyanate(2,4-isomer and/or 2,6-isomer), diphenyl diisocyanate, triphenyl diisocyanate, chlorophenyl-2,4-diisocyanate, p-phenylene diisocyanate, xylylene diisocyanate, diphenylmethane diisocyanate, naphthylene diisocyanate, and polyisocyanates which are obtained by the reaction of a low-molecular polycondensate of aniline and formaldehyde with phosgene. Among them, the one in which the ratio of 2,4-isomer to 2,6-isomer is 80:20 to 65:35 is economically preferable because of its availability at a low price.

The isocyanate index may preferably be from 80 to 130, which is the ratio of the amount of polyisocyanate used to the total amount of polyhydroxy compounds and other compounds having active hydrogen atoms. The preferred isocyanate index is 100 to 115 if the resulting polyurethane foam is to have improved flame retardance and a low level of smoking. The more desirable isocyanate index is 103 to 112 if the resulting urethane foam is to have improved physical properties.

The blowing agent used in this invention is water or a low-boiling volatile liquid. Examples of low-boiling volatile liquids are halogenated hydrocarbons which include trichloromonofluoromethane, dibromodifluoromethane, dichlorodifluoromethane, dichlorotetrafluoroethane, monochlorodifluoromethane, trifluoroethylbromide, dichloromethane, and methylene chloride. They may be used alone or in combination with one another.

The catalyst used in this invention is an amine compound such as triethylenediamine, N-methylmorpholine, tetramethyl-1,4-butanediamine, N-methylpiperazine, dimethylethanolamine, diethylethanolamine, and triethylamine; and an organometallic compound such as stannous octoate, dibutyltin dilaurate, and dibytyltin di-2-ethylhexoate. They may be used alone or in combination with one another. The catalyst is used in a broad range of amount; usually 0.005 to 2.0 parts by weight for 100 parts by weight of polyhydroxy compound.

The foam stabilizer used in this invention is a silicone-based foam stabilizer which is commonly used in the production of polyurethane foam. Examples of foam stabilizers are organosilicon surfactants which include organosiloxane-polyoxyalkylene copolymer and polyalkenyl siloxane having polyoxyalkylene side chains. It is used in an amount of 0.1 to 3.0 parts by weight, preferably 0.5 to 2.0 parts by weight, for 100 parts by weight of polyhydroxy compound.

According to this invention, a triaryl phosphate ester represented by the following formula is used as a flame retardant.

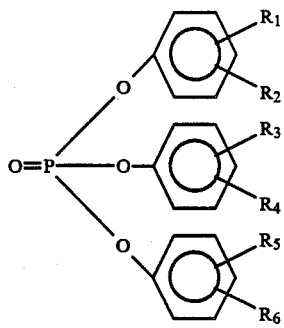

[where $R_1$ to $R_6$ are a substituent group selected from H and $C_nH_{2n+1}$ (where n is an integer of 1 to 9), with the exception of an instance where $R_1=R_3=R_5=H$ and $R_2=R_4=R_6=CH_3$]. This compound is explained below.

The preferred triaryl phosphate ester contains 6 to 9.5% by weight of phosphorus. The typical four examples are given below.

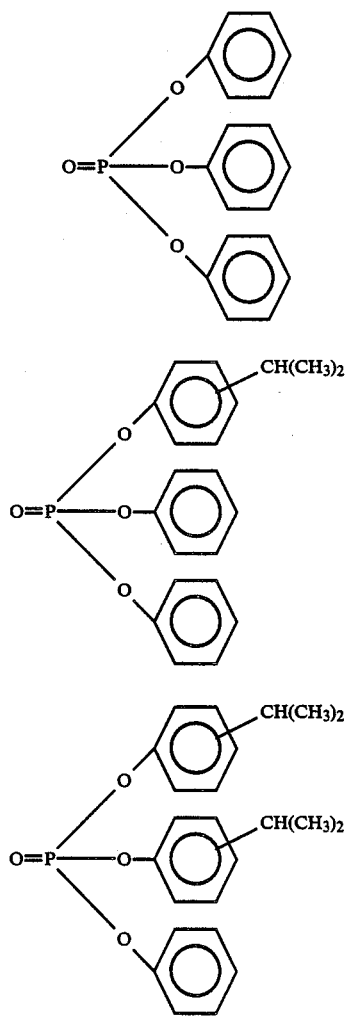

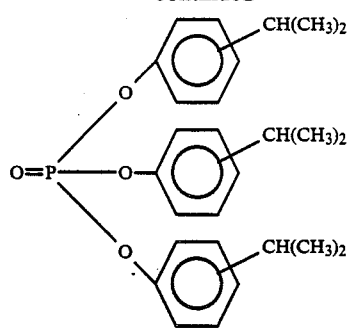

The above listed triaryl phosphate esters may be used individually or in combination with one another. In addition, the triaryl phosphate ester may be used in combination with other flame retardants, in which case the content of triaryl phosphate ester should preferably be more than 50% by weight; otherwise, there would be more chances of skin staining.

The triaryl phosphate ester should be used in an amount of 5 to 30 parts by weight, preferably 7 to 20 parts by weight, for 100 parts by weight of the above-mentioned high-molecular-weight polyhydroxy compound. Any amount below this limit is not effective in improving flame retardance, and any amount over this limit causes skin staining and aggravates weldability.

It is within the scope of this invention to add additives such as cross-linking agent, anti-oxidant, and pigment, as required, to the above-mentioned components.

According to this invention, polyurethane foam is produced in the commonly practiced manner, for example, the so-called one-shot process in which the polyhydroxy compounds, water, catalyst, flame retardant, foam stabilizer, and polyisocyanate are mixed all together at a time and are allowed to react to make foam, or the prepolymer process in which a portion of the polyhydroxy compounds is previously reacted with all the polyisocyanate and the thus prepared prepolymer is subsequently mixed with the remainder of the polyhydroxy compounds to make foam. In the foaming process, a predetermined amount of catalyst is uniformly mixed with the polyhydroxy compounds.

The polyurethane foam produced according to the process of this invention is useful as a wadding material, celling panel, and vehicle foam which is used at comparatively high temperatures.

According to this invention, it is possible to improve the flame retardance of polyurethane foam while keeping good weldability, without causing skin staining, by using the above-mentioned specific triaryl phosphate ester as a flame retardance and a mixture composed of a high-molecular-weight polyhydroxy compound having a hydroxyl number of lower than 100 and a low-molecular-weight polyhydroxy compound having a hydroxyl number of higher than 560 and having 2 to 4 hydroxyl groups in one molecule.

The invention is now described in more detail with reference to the following examples, which should not be construed to restrict the scope of this invention.

EXAMPLES

Different kinds of flexible polyurethane foam were produced in the usual one-shot process. The formulation of raw materials is shown in Tables 1 and 2. The resulting polyurethane foam had the physical properties, flame retardance, level of surface staining, and peel strength for welding nylon cloth as shown in Table 2.

In the examples, the flame retardance was measured according to FMVSS-302 (burning test for vehicle interior materials). The burning rate was measured for foam test specimens 6.0 mm in thickness. The level of skin staining was determined by visually inspecting the discloration of a nylon cloth fixed by stapling in close contact with a foam specimen measuring 100×50×10 mm. The foamcloth assembly was enclosed in a 500-cc wide-mouthed bottle, and the bottle was placed in a constant-temperature bath at 100° C. for 200 hours prior to inspection.

TABLE 1

| Formulation (parts by weight) | |
|---|---|
| Triol (Molecular Weight 3000)*1 | 100 |
| Diethylene glycol*2 | 1.5 |
| Tolylene diisocyanate*3 | 44.2 |
| Water | 3.0 |
| Triethylenediamine | 0.15 |
| F-258*4 | 1.2 |
| Stannous octoate | 0.25 |
| Trichloromonofluoromethane | 3.0 |

*1High-molecular-weight polyol.
*2Low-molecular-weight polyol.
*3Ratio of 2,4-/2,6-isomers = 80/20
*4Polyalkylsiloxane-polyoxyethylene-polyoxypropylne copolymer made by Shin-Etsu Chemical Co., Ltd.

TABLE 2

| | Invention | | | Comparison | |
|---|---|---|---|---|---|
| | 1 | 2 | 3 | 4 | 5 |
| Flame retardant, Product | Mixture of triaryl phosphates* | | | I** | II*** |
| Amount (parts by weight) | 3 | 10 | 15 | 10 | 10 |
| Physical properties | | | | | |
| Density (g/cm³) | 0.0293 | 0.0304 | 0.0312 | 0.0305 | 0.0301 |
| 25% hardness (kgf) | 10.8 | 9.6 | 9.2 | 9.5 | 9.2 |
| Tensile strength (kg/cm²) | 1.13 | 1.09 | 1.10 | 1.08 | 1.06 |
| Elongation (%) | 185 | 195 | 203 | 200 | 197 |
| Compression set (%) under heating | 2.4 | 2.6 | 2.6 | 2.7 | 3.1 |
| Flame retardance | | | | | |
| Burning rate (mm/min) | 124 | S.E. | S.E. | S.E. | S.E. |
| Judgment | Fail | Pass | Pass | Pass | Pass |
| Level of skin staining | Low | Low | Low | High | Very high |
| Peel strength (g/inch) | 450 | 430 | 400 | 420 | 440 |

*A mixture of the above-mentioned compounds (1) to (4)
**Tris(2,3-dichloroproply)phosphate
***Polychlorophosphonate
S.E. stands for self-extinguishing.

It is to be noted from Table 2 that the flame-retardant polyurethane foam produced according to the process of this invention has good skin weldability and very low level of skin staining. Moreover, the polyurethane foam is not impaired in physical properties. It is also noted that the flame retardance of polyurethane foam is greatly improved when more than 5 parts by weight of triaryl phosphate ester is added for 100 parts by weight of high-molecular-weight polyhydroxy compound.

What is claimed is:

1. A flexible polyurethane foam which comprises: a polyhydroxy compound, an organic polyisocyanate compound, a blowing agent, a catalyst, a foam stabilizer, and flame retardant, wherein said flame retardant contains a triaryl phosphate ester represented by the following formula:

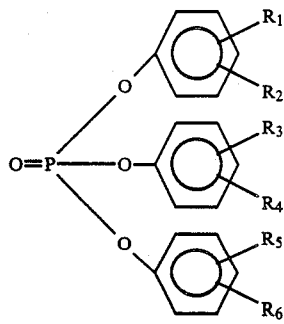

wherein $R_1$ to $R_6$ are substituent groups independently selected from the group consisting of H and $C_nH_{2n+1}$, with the exception of the instances wherein $R_1=R_3=R_5=H$ and $R_2=R_4=R_6=CH_3$, and wherein said polyhydroxy compound is a mixture composed of (1) 100 parts by weight of a high-molecular-weight polyhydroxy compound having a hydroxyl number lower than 100 and (2) 0.5 to 10 parts by weight of a low-molecular-weight polyhydroxy compound having a hydroxy number higher than 560 and having 2 to 4 hydroxy groups in each molecule.

2. The flexible polyurethane foam as in claim 1, wherein the content of said triaryl phosphate ester in said flame retardant is more than 50% by weight.

3. The flexible polyurethane foam as claim 1, wherein the content of said triaryl phosphate ester is 5 to 30 parts by weight for 100 parts by weight of said high-molecular-weight polyhydroxy compound.

4. The flexible polyurethane foam as in claim 1, wherein said triaryl phosphate ester contains 6 to 9.5% by weight of phosphorus.

5. The flexible polyurethane foam as in claim 2, whrein the content of said triaryl phosphate ester is 5 to 30 parts by weight for 100 parts by weight of said high-molecular-weight polyhydroxy compound.

6. The flexible polyurethane foam as in claim 2, wherein said triaryl phosphate ester contains 6 to 9.5% by weight of phosphorus.

7. The flexible polyurethane as claimed in claim 3, wherein said triaryl phosphate ester contains 6 to 9.5% by weight of phosphorus.

8. The flexible polyurethane foam as in claim 1, wherein said flame retardant consists essentially of said triaryl phosphate ester.

9. The flexible polyurethane foam as in claim 8, wherein the content of said triaryl phosphate ester is 5 to 30 parts by weight for 100 parts by weight of said high-molecular-weight polyhydroxy compound.

10. The flexible polyurethane foam as claim 1, wherein said flame retardant is selected from the group consisting of triaryl phosphate esters represented by the following formulae:

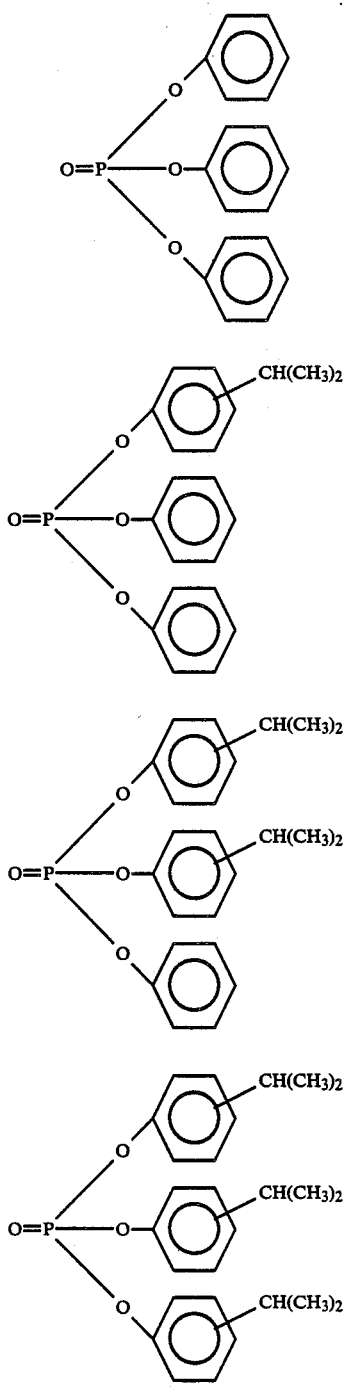

11. The flexible polyurethane foam as in claim 10, wherein the content of said triaryl phosphate ester in said flame retardant is more than 50% by weight.

12. The flexible polyurethane foam as in claim 10, wherein the content of said triaryl phosphate ester in said flame retardant is 100% by weight.

13. The flexible polyurethane foam as in claim 1, wherein said polyhydroxy compound is a mixture composed of 100 parts by weight of a high-molecular-weight polyhydroxy compound and 0.5 to 5 parts by weight of a low-molecular-weight polyhydroxy compound.

14. The flexible polyurethane foam as in claim 1, wherein the ratio of the amount of polyisocyanate used to the total amount of polyhydroxy compounds and other compounds having active hydrogen atoms is 103 to 112.

15. The flexible polyurethane as in claim 1, wherein said high-molecular-weight polyhydroxy compound is poly(oxypropylene) triol, said low-molecular-weight polyhydroxy compound is diethylene glycol, said organic polyisocyanate compound is tolylene diisocyanate, said blowing agent is water and trichloromonofluoromethane, said catalyst is triethylenediamine and stannous octoate, said foam stabilizer is a polyalkylsiloxane-polyoxyethylene-polyoxypropylene copolymer, and said triaryl phosphate ester is a mixture of esters represented by the following formulae:

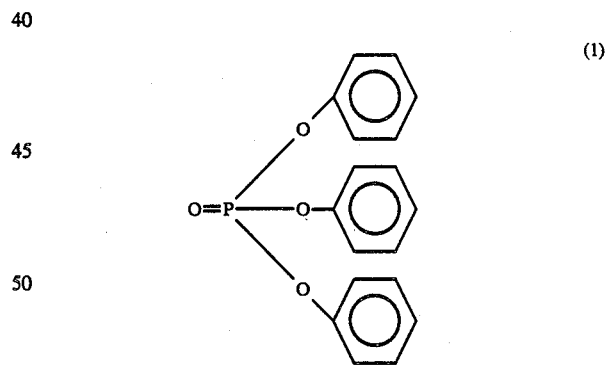

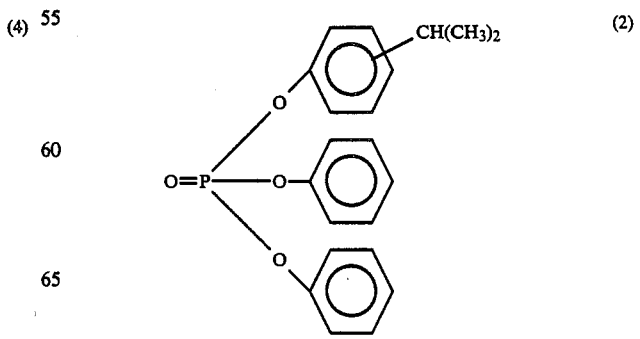

-continued
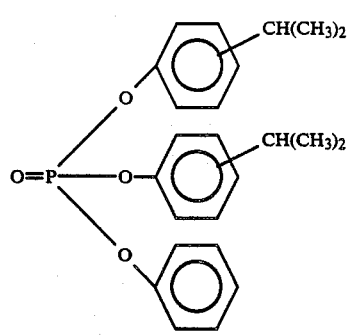
(3)
-continued
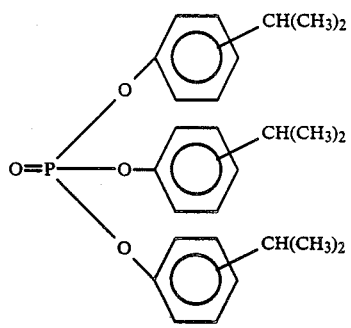
(4)
* * * * *